Figure 2:
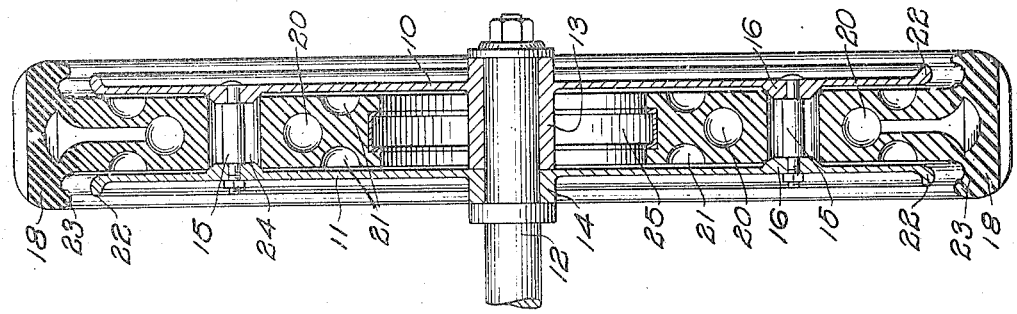

P. PIERI.
RESILIENT WHEEL.
APPLICATION FILED AUG. 10, 1915.

1,180,076.

Patented Apr. 18, 1916.
2 SHEETS—SHEET 1.

WITNESSES

INVENTOR
P. Pieri
BY
ATTORNEYS

P. PIERI.
RESILIENT WHEEL.
APPLICATION FILED AUG. 10, 1915.
1,180,076.
Patented Apr. 18, 1916.
2 SHEETS—SHEET 2.
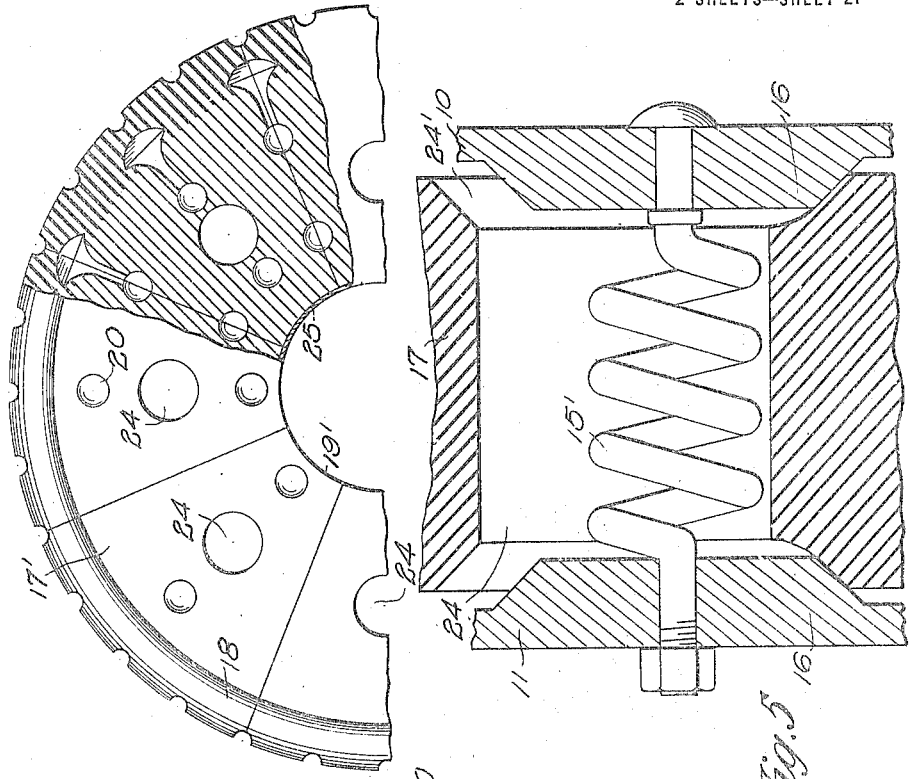
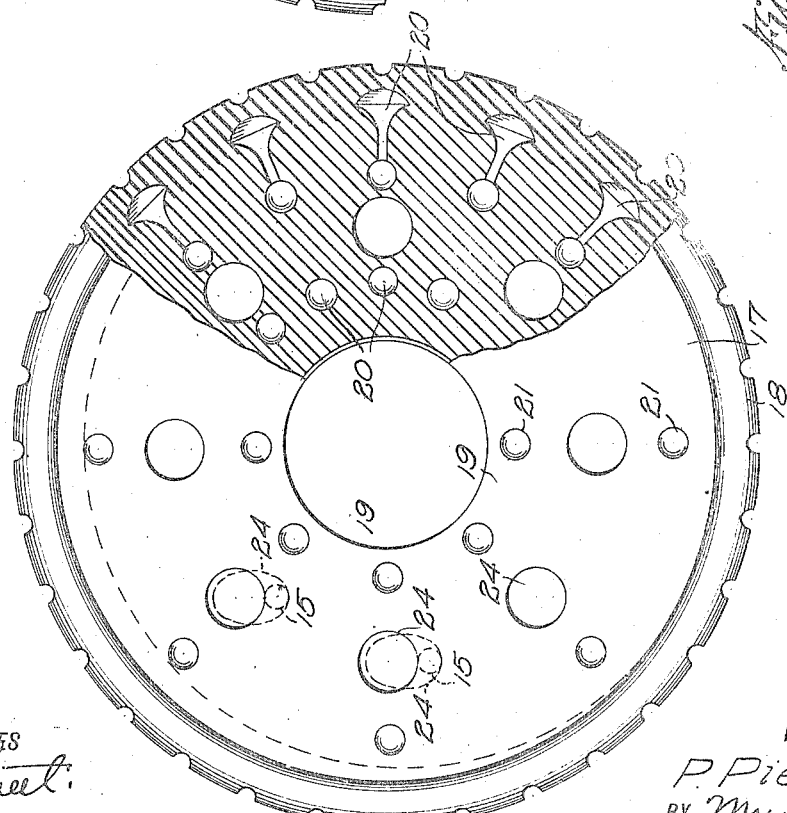
WITNESSES
INVENTOR
P. Pieri
BY
ATTORNEYS

UNITED STATES PATENT OFFICE.

POMPEO PIERI, OF NEW YORK, N. Y.

RESILIENT WHEEL.

1,180,076.  Specification of Letters Patent.  Patented Apr. 18, 1916.

Application filed August 10, 1915. Serial No. 44,689.

*To all whom it may concern:*

Be it known that I, POMPEO PIERI, a subject of the King of Italy, and a resident of the city of New York, borough of Manhattan, in the county and State of New York, have invented a new and Improved Resilient Wheel, of which the following is a full, clear, and exact description.

This invention relates to vehicle wheels or the like and has particular reference to the construction of wheels intended especially for automobiles or other vehicles intended for the conveyance of passengers or other loads.

Among the objects of the invention is to construct a vehicle wheel of peculiar form and possessed of special resiliency or ease of action under various loads or inequalities of roadway.

More definitely stated, my object is to construct a wheel comprising a hub having one or more face plates formed integrally with or secured to the hub, and a core or body adjacent the face plate or between a plurality of such plates, the core being of live flexible or resilient material and having a certain amount of loose free radial action with respect to the hub and face plates and also having a comparatively large amount of free space at its center from said hub.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 1:
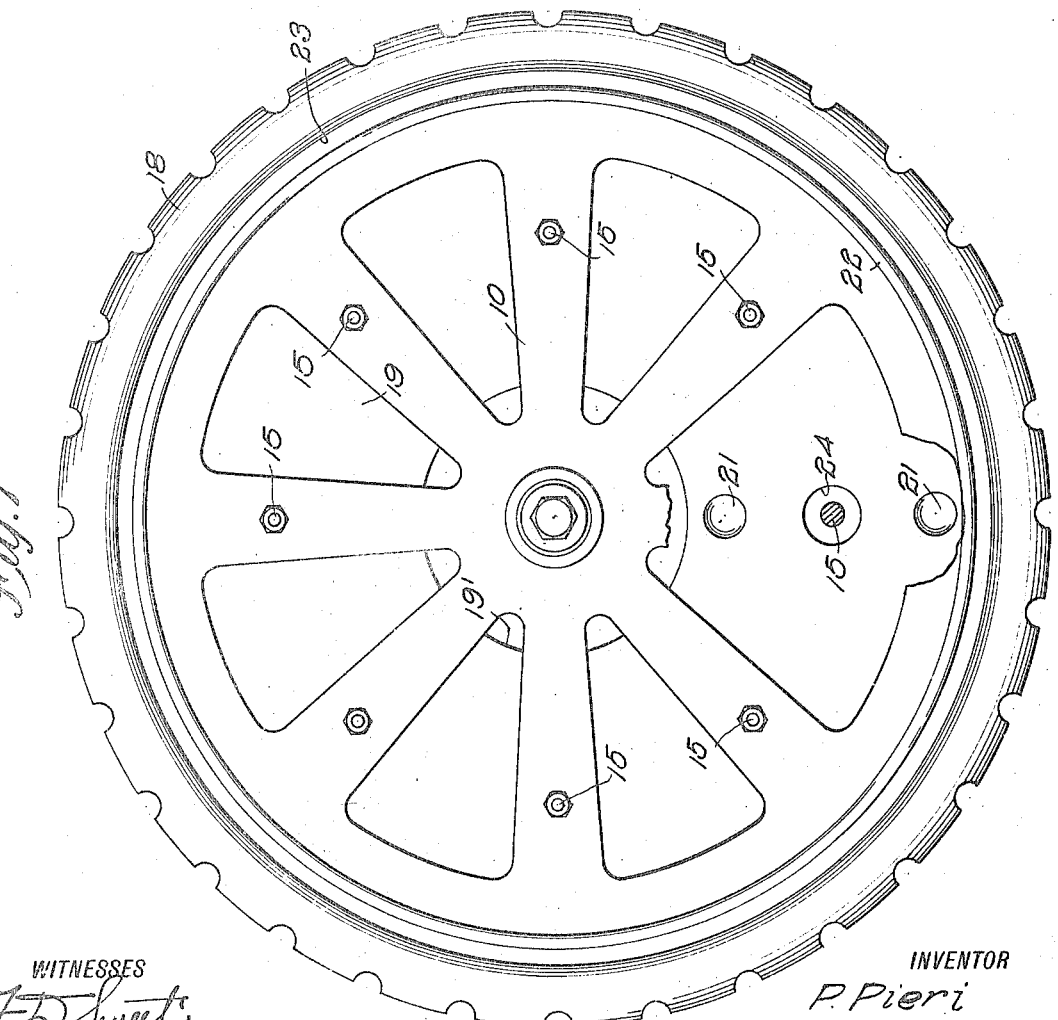

Figure 1 is a side elevation of a wheel made in accordance with this invention, the several parts being concentrically arranged; Fig. 2 is a vertical transverse section of the same; Fig. 3 is a side elevation of the wheel body or core partly in section to show a character of inner construction and also indicating in dotted lines the relative movement between the face plates and the body in practice; Fig. 4 is a view similar to Fig. 3 but indicating a slight modification in body construction; and Fig. 5 is an enlarged cross sectional detail of a slight modification in load supporting pintles.

Referring now more particularly to the drawings, I show a wheel comprising two face plates 10 and 11 typical of any substantially stiff, rigid supporting or connecting means for the wheel in connection with the axle 12. The immediate connection with the axle is had through a hub comprising a member 13 rigidly connected to the face plate 10 and a shorter hub member 14 connected to the other face plate. Said face plates may be made of any suitable material and are preferably of a skeleton or spider-like construction for the sake of maximum strength in proportion to the weight and to add to the appearance of the structure as a whole. By reason of the openwork of the face plates, substantially free access is had to the interior structure for inspection, repair, cleansing and other purposes. These face plates are spaced from each other and are so maintained, either rigidly or otherwise, by means of load supporting pintles shown in the main views at 15 as being of circular contour and rigidly connected at their opposite ends in reinforced seats 16 of the plates. While these pintles are shown as cylindrical in form, it is obvious that they may partake of any other suitable form from end to end. Hence, as indicated in Fig. 5, the pintle 15′ is of spiral construction and posseses a certain amount of flexibility both longitudinally and laterally; otherwise the purpose and operation of this form of pintle is substantially the same as in the main figures. Any suitable number of these pintles may be employed, and they may be located at any desired radial distance from the hub of the wheel, it being essential, however, that a considerable number of them be used and that they therefore coöperate with the body of the wheel at a large number of well distributed points.

The body above referred to is shown as a whole at 17 and as already premised is constructed preferably of a single piece or mass of material of a flexible, resilient nature, such as a high grade of live rubber or its equivalent. The body is formed with a tread portion 18 of a width sufficient to embrace the side plates and to simulate in appearance the common form of pneumatic wheels. The radial depth of the tread 18 may vary according to the purpose for which the wheel is to be used and constitutes therefore in itself a considerable amount of cushion. The body 17 also includes a central web 19 projecting inwardly from the center line of the tread portion 18. The web as a whole is substantially flat and is preferably provided with any suitable number, form or arrangement of cavities either closed as indicated at 20 or open as indicated at 21. These cavities 20 and 21 may readily be formed in the construction of the wheel body, and, without detracting materially from the strength of the construction, may greatly increase the flexibility thereof as well as decrease the weight and cost of the construction.

The periphery of each face plate consists of an outwardly turned roll or flange constituting a continuous circular tread rim 22. Each of these rims 22 is surrounded and inclosed by a laterally and inwardly projecting bead 23 of the body tread 18. The active surface of the bead, however, is normally spaced from the tread rim 22 at all points, even while the wheel is sustaining light or moderate loads, subject, however, to actual contact between the tread rim and bead under excessive loads or abnormal shocks, at which time the excess of the shock or load is borne upon and directly through that portion of the tread 18 in contact with the roadway.

The normal load is supported by the pintles 15 extending loosely through holes or openings 24 formed through the web 19. The disparity between the diameters of the pintles and the holes 24 may vary according to different conditions, but I prefer that the holes 24 be appreciably greater in diameter than the pintles for various reasons including, first, the increased flexibility or displacement permitted between the several relatively movable parts, and, secondly, the adaptability of any of the lower pintles to stretch the material of the web above their bearing points tending to elongate the holes 24, as indicated in dotted lines in Fig. 3. Since the tread portion 18 is heavier and may be formed of stiffer or harder material than the web portion 19, the upper portion thereof or that portion remote from the roadway may have a tendency to maintain the true circular form and hence to a certain extent will constitute a resistance for the stretching action just described.

The central opening 19' of the web is preferably spaced freely from the hub and may be bounded with a metallic reinforcing ring 25.

In Fig. 4 I show a wheel body 18' having the same general characteristics and form in the main as already described, but indicated as being made up of a plurality of segments vulcanized or otherwise secured together making a complete structure.

As indicated in Fig. 5, the reinforcements 16 of the side plates may have bearing contact with the resilient body web 17 slightly before the pintles connecting the side plates come into contact. In other words, the wheel in idle position may have the parts so related that they are practically concentric with their pintles spaced from the walls of the openings 24, but when in upright position or supporting the lightest loads the support will be had at the edges 24' at the ends of the holes 24, but as already set forth, the main normal load support is had between the pintles and the main walls at the bottoms of the holes 24.

I claim:—

1. In a wheel, the combination of a resilient body comprising a tread portion and a web portion projecting inwardly therefrom, said web portion having a large central opening, a hub extending loosely through the opening, a pair of side plates of rigid material on opposite sides of the web and secured to the hub, the peripheries of the side plates constituting circular rims spaced inwardly from the tread portion of the body and hence normally out of contact therewith, and means providing loose contacting connection between the side plates and the body web at numerous well distributed points.

2. In a wheel, the combination of a resilient body comprising a wide tread portion and a relatively narrow web portion projecting inwardly from the center of the tread portion, the side portions of the tread beyond the web projecting laterally and thence inwardly forming beads, said web being formed with a large central opening and a multiplicity of other transverse openings at widely distributed points, a hub extending through the central opening of the web, a pair of side plates connected to the hub and projecting outwardly therefrom on opposite sides of the web, said side plates being bounded by circular peripheral tread rims spaced inwardly normally from said beads but adapted to engage said beads when the wheel is subjected to unusual shocks or loads, and a multiplicity of bearing pintles extending between the side plates and having normal bearing contact with the walls of the multiplicity of web openings.

3. In a wheel, the combination of a resilient body comprising integral tread and web portions, the web portion being narrower and of greater resiliency than the tread portion, said tread also being provided with a multiplicity of widely distributed transverse openings, a pair of side plates embracing opposite sides of the web and spaced normally inwardly from the tread portion, and a plurality of pintles having their ends rigidly connected to the side plates and extending loosely through said web openings constituting the normal means for supporting a load upon the resilient body.

4. In a wheel, the combination of a resilient body comprising integral tread and web portions of vulcanized rubber, the tread portion being more highly vulcanized than the web portion, a hub extending loosely through the center of the web, rigid supporting means extending outwardly from the hub along the web and spaced normally inwardly from the projecting portion of the tread, and a plurality of widely distributed bearing members having their ends connected rigidly to said supporting means and extending thence loosely through said web.

5. In a wheel, the combination of a body comprising integral resilient tread and web portions, said web being more resilient than the tread and provided with a large circular central opening and being provided furthermore with a plurality of transverse openings between the central opening and the tread, a hub extending through the central opening, rigid supporting means connected to the hub and extending outwardly therefrom along the web, a plurality of supporting pintles having their ends secured rigidly to the supporting means aforesaid and extending loosely through said plurality of openings, and a rigid metallic reinforcing ring surrounding said central opening and embedded in the wall thereof.

POMPEO PIERI.

Witnesses:
PHILIP D. ROLLHAUS,
A. H. DAVIS.